March 26, 1929. E. P. RENAUX 1,706,591

SERVO BRAKE MECHANISM

Original Filed March 14, 1923

INVENTOR
EUGENE P. RENAUX
BY
M. W. McConkey
ATTORNEY

Patented Mar. 26, 1929.

1,706,591

UNITED STATES PATENT OFFICE.

EUGÈNE PROSPER RENAUX, OF PARIS, FRANCE, ASSIGNOR TO BENDIX BRAKE COMPANY, OF CHICAGO, ILLINOIS, A CORPORATION OF ILLINOIS.

SERVO-BRAKE MECHANISM.

Original application filed March 14, 1923, Serial No. 625,072, and in France December 14, 1922. Divided and this application filed April 15, 1926. Serial No. 102,138.

This invention relates to brakes and is illustrated as embodied in an internal expanding brake for an automobile wheel.

An important object of the invention relates to providing efficient power-multiplying means operated by a servo shoe or the like to give an easy application of the brake. In one desirable arrangement this power-multiplying means includes a lever fulcrumed between the axis of the brake drum and its circumference, for example substantially midway between the axis and the circumference, which is operated by a servo shoe illustrated as pivotally linked to the end of the lever in such a manner as to force the anchored shoe or equivalent friction means against the brake drum. I prefer to have the anchored shoe forced against the drum by a cam rocked by the above-described lever.

Other features of novelty relate to the novel arrangement of a brake shoe such as the above-described servo shoe, for movement about the axis of the brake drum, for example by being provided with novel yoke arms shown connected by a leaf spring straddling a support; also to a novel applying device including a crank arm having a roller engaging the servo shoes or the like and permitting it to have a considerable range of movement within the brake drum.

Figure 1:
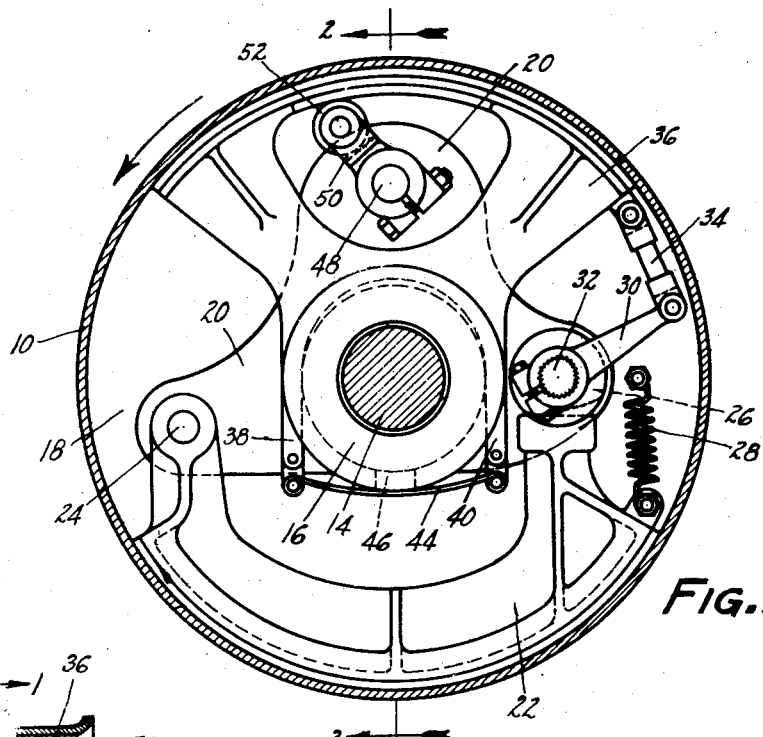
Figure 2:
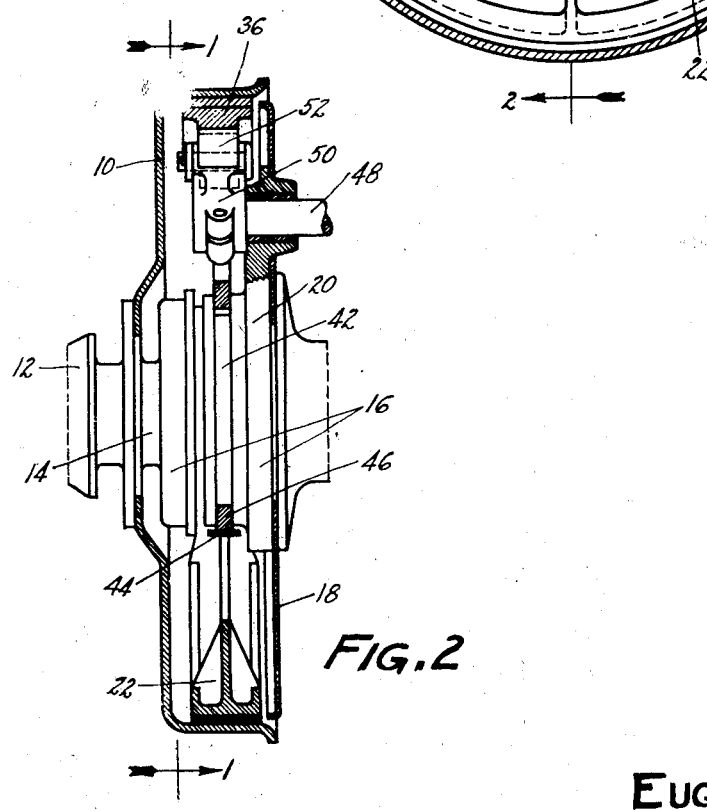

The above and other objects and features of the invention, including various novel combinations of parts and desirable particular constructions, will be apparent from the following description of one illustrative embodiment shown in the accompanying drawings, in which:

Figure 1 is a vertical section through the brake just inside the head of the brake drum, showing the brake shoes in side elevation; and Figure 2 is a vertical section through the brake on the line 2—2 of Figure 1.

The particular brake illustrated includes a rotatable drum 10 having the usual peripheral cylindrical braking flange arranged to turn with the wheel of the vehicle, the hub of which wheel is shown in Figure 2 at
12. The wheel is shown driven by a suitable live axle 14 projecting through the usual axle housing 16. At the open side of the drum is arranged a backing plate 18, illustrated as a light stamping secured to a flange or support 20 of the axle housing 16.

Within the drum 10 is arranged the friction means of the brake illustrated as including an arcuate and substantially rigid brake shoe 22 anchored at one end as for example by a pivot 24 connecting it to the support 20. The shoe 22 is forced against the drum in applying the brake by means such as a cam 26 against the resistance of the return spring 28 connected at its ends to the backing plate and to the unanchored end of the shoe. The cam 26 or its equivalent is operated by a lever 30 adjustably clamped on the shaft 32 of the cam, which shaft is journalled in the support 20 approximately midway between the axis of the drum and the circumference of the drum. The lever 30 preferably extends generally outward with respect to the drum and its outer end is pivotally connected to a link 34 which is pivoted to one end of the novel servo shoe 36, sometimes referred to as a "booster" shoe or a "relay" shoe.

The servo shoe 36 is shown formed with yoke arms 38 and 40 straddling a support or part of circular outline formed on the axle housing 16 and shown as including a groove or channel 42 holding the yoke arms against movement axially of the drum. At their lower ends the yoke arms 38 and 40 may be connected by leaf spring 44 having a block 46 seated against the bottom of the channel in such a manner that the leaf spring resists radial movement of the shoe 36. The shoe is forced against the drum to apply the brake by a shaft 48 journalled in the support 20 and having crank arm 50 carrying a roller 52 engaging an arcuate surface on the shoe 36 which, when the brake is applied, is co-axial with respect to the drum.

In the drawings the brake is shown applied with the drum in Figure 1 turning in a counter-clockwise direction. The roller 52 has been operated by the shaft 48 to force the shoe 36 against the drum against the resistance of its spring 44 and the shoe 36 has turned to the left in Figure 1 to rock the lever 30 to operate its cam 26 forcing the shoe 22 against the drum. If the drum should be turning in a clockwise direction when the brake is applied the shoe 36 would move to the right in Figure 1, applying the shoe 22 through the cam 26 and the lever 30 as before.

While one illustrative embodiment of the invention has been described in detail, it is not my intention to limit its scope to that particular embodiment or otherwise than by the terms of the appended claims. All of the subject-matter claimed herein is divided from my co-pending application No. 625,072, filed March 14, 1923.

I claim:

1. A brake comprising, in combination, a rotatable drum, a support of circular outline co-axial with respect to the drum, and friction means including a shoe having yoke arms embracing said support and angularly movable thereon.

2. A brake comprising, in combination, a rotatable drum, a support of circular outline co-axial with respect to the drum, and friction means including a shoe having yoke arms embracing said support and angularly movable thereon and arranged for slidable movement on the support to permit radial movement of the shoe into engagement with the drum.

3. A brake comprising, in combination, a rotatable drum, a support of circular outline co-axial with respect to the drum, and friction means including a shoe having yoke arms straddling said support, together with a leaf spring connecting the yoke arms and resisting movement of the shoe radially of the drum.

4. A brake comprising, in combination, a drum, a support, and a friction device mounted upon the support for movement as a unit thereover radially of the drum and for pivotal movement thereabout within the drum.

5. A brake comprising, in combination, a drum, a support at the axis of the drum, and a friction device mounted upon the support for movement thereover radially of the drum and for pivotal movement thereabout within the drum.

6. A brake comprising, in combination, a drum, a support, and a friction device mounted within the drum upon the support for movement bodily radially into engagement with the drum and which is rotatable upon said support about the axis of the drum.

7. A brake having, in combination, a drum, a friction device supported therein to be moved radially into engagement therewith, means exerting a brake-applying force on said friction device and a leaf spring resisting said brake-applying force.

8. A brake having, in combination, a drum, a friction device supported therein to be moved thereagainst and angularly movable about its support with the drum, and a leaf spring exerting a tension on said friction device at all angular positions thereof radially inwardly of the drum.

In testimony whereof, I have hereunto signed my name.

EUGÈNE PROSPER RENAUX.